United States Patent
Ishii

(10) Patent No.: US 7,567,585 B2
(45) Date of Patent: Jul. 28, 2009

(54) AUTOMATIC CHANGE METHOD OF VIRTUAL CONCATENATION BANDWIDTH

(75) Inventor: Yusuke Ishii, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1148 days.

(21) Appl. No.: 10/822,835

(22) Filed: Apr. 13, 2004

(65) Prior Publication Data

US 2005/0135435 A1    Jun. 23, 2005

(30) Foreign Application Priority Data

Dec. 18, 2003   (JP) .............................. 2003-420554

(51) Int. Cl.
  *H04J 3/02*   (2006.01)
  *H04J 15/00*  (2006.01)
(52) U.S. Cl. ...................... 370/468; 370/539
(58) Field of Classification Search .......... 370/539, 370/907, 468, 395.4, 395.41
  See application file for complete search history.

(56) References Cited

U.S. PATENT DOCUMENTS

| 6,697,373 | B1* | 2/2004 | Sandstrom ............... 370/405 |
| 2003/0137937 | A1 | 7/2003 | Tsukishima et al. |
| 2004/0076176 | A1* | 4/2004 | Kfir ............... 370/465 |
| 2004/0252633 | A1* | 12/2004 | Acharya et al. ............ 370/216 |
| 2005/0073955 | A1* | 4/2005 | MacLean et al. ............ 370/235 |

FOREIGN PATENT DOCUMENTS

| JP | 2000-216802 | 8/2000 |
| JP | 2002-368774 | 12/2002 |
| JP | 2003-324473 | 11/2003 |

OTHER PUBLICATIONS

Atrica "Migration from SONET/SDH to Carrier Ethernet in Metropolitan Area" 2003.*
Japanese Office Action issued on Feb. 20, 2009 in corresponding Japanese Patent Application 2003-420554.

* cited by examiner

*Primary Examiner*—Chirag G Shah
*Assistant Examiner*—Ramtin Kangarloo
(74) *Attorney, Agent, or Firm*—Staas & Halsey LLP

(57) ABSTRACT

Equipment enables an improved efficiency in network bandwidth usage, and an improved upper-layer throughput even when abrupt change occurs in input traffic. The equipment includes an input traffic collector which collects and retains an input traffic amount of each input port for one period at preset periods; a bandwidth set processor which calculates a bandwidth for use in each input port from the input traffic amount retained in the input traffic collector, and calculates the corresponding number of virtual concatenation member paths from the difference of the bandwidth in use and a virtual concatenation path bandwidth having been allocated to the input port, and issues an addition command or a deletion command for adding or deleting the virtual concatenation member paths for the calculated number; a virtual concatenation controller which sets a virtual concatenation path bandwidth against the traffic input from the plurality of ports; and a link capacity adjustment scheme controller which sets and changes the virtual concatenation to the virtual concatenation controller, based on the addition command or the deletion command of the virtual concatenation member paths issued by the bandwidth set processor.

6 Claims, 5 Drawing Sheets

| VCAT member path ID | Path destination | Input port ID |
|---|---|---|
| VC#1 | Node#A | 1 |
| VC#2 | Node#A | 1 |
| VC#3 | Node#A | 2 |
| VC#4 | Node#A | 2 |

| Input port ID | Bandwidth allocation priority | Minimum guarantee bandwidth |
|---|---|---|
| 1 | 5 | 100Mbps |
| 2 | 10 | 150Mbps |

FIG. 7

| Value msb...lsb | Command | Remarks |
|---|---|---|
| 0000 | FIXED | This is an indication that this end uses fixed bandwidth (non-LCAS mode) |
| 0001 | ADD | This member is about to be added to the group |
| 0010 | NORM | Normal transmission |
| 0011 | EOS | End of Sequence indication and Normal transmission |
| 0101 | IDLE | This member is not part of the group or about to be removed |
| 1111 | DNU | Do Not Use (the payload) the Sk side reported FAIL status |

AUTOMATIC CHANGE METHOD OF VIRTUAL CONCATENATION BANDWIDTH

FIELD OF THE INVENTION

The present invention relates to a transmission technique for data communication traffic through packet communication using IP (Internet Protocol), etc., employing Virtual Concatenation (specified in ITU-T Recommendation G.707/Y.1322) and Link Capacity Adjustment Scheme (ITU-T Recommendation G.7042/Y.1305), for efficient use of bandwidth in the SONET/SDH (Synchronous Optical Network/Synchronous Digital Hierarchy) network.

BACKGROUND OF THE INVENTION

The rise of Internet usage in recent years, etc. have brought increasing desire of data communication, typically through IP (Internet Protocol), in the SONET/SDH networks originally designed to carry voice traffic. However, because of the SONET/SDH standards designed for application to voice traffic, there has been a problem of inefficiency in data communication from the viewpoint of network bandwidth usage.

As techniques for solving such a problem, Virtual Concatenation (hereafter referred to as VCAT) and Link Capacity Adjustment Scheme (hereafter referred to as LCAS) have been devised.

FIG. 1 is an exemplary configuration of transmission equipment using VCAT and LCAS. In this transmission equipment, packets input from a plurality of ports P1, P2 via Ethernet interfaces 4, 5 ('Ethernet' is a trademark) are forwarded to a VCAT controller 2. In this VCAT controller 2, a plurality of VCAT member paths having a common destination are collected into a VCAT path.

After switched to a corresponding route by a switch SW, the VCAT path is forwarded to an OC-n line 100 connected to a SONET/SDH network 101, via an OC-n interface 1.

Here, when accommodating a 100-Mbps Fast Ethernet packet input to SONET/SDH network 101 at a maximum rate, two STS 1 paths (51.84 Mbps each) bundled into an STS 1-2v path (approximately 100 Mbps) can be used.

Without use of such VCAT, it is compelled to use an STS-3c path (approximately 155 Mbps) nearest to 100 Mbps, which results in wasting 55 Mbps.

Further, in LCAS (Link Capacity Adjustment Scheme), addition or deletion of SONET/SDH unit paths (VCAT member paths) in a VCAT bandwidth can be performed without interrupting the transmission service, by use of LCAS controller 3. Also, in the event of failure on a VCAT path, the transmission service can be continued by automatically deleting the failed path from VCAT.

As a technique for changing a VCAT bandwidth (the number of VCAT member paths) without interrupting the transmission service, LCAS has been standardized in ITU-T Recommendation G.7042/Y.1305, Link Capacity Adjustment Scheme (LCAS) for Virtual Concatenated Signals, November, 2001.

When increasing the VCAT bandwidth, namely when adding a VCAT member path, an ADD command (refer to FIG. 7) is described in the H4 byte of POH (path overhead) of the VCAT member path concerned, thereby enabling synchronization of bandwidth change timing on both the transmitting side and the receiving side. With this, uninterrupted bandwidth change can be attained.

Similarly, when decreasing the VCAT bandwidth, namely when deleting a VCAT member path, an IDLE command (refer to FIG. 7) is described in the H4 byte of POH of the VCAT member path concerned, thereby enabling synchronization of a bandwidth change timing on the transmitting side and the receiving side. With this, uninterrupted bandwidth change is also attained.

When the bandwidth is to change without use of LCAS, it is necessary to disconnect the VCAT once. Also, data transmission becomes disabled when a failure occurs in any one path of the VCAT member paths. Therefore, by introducing VCAT and LCAS, efficient usage of the bandwidths in SONET/SDH network 101 can be attained even when the network is used for data communication.

Additionally, as a related known art, there has been a technique such as shown in the official gazette of the Japanese Unexamined Patent Publication No. 2002-368774.

Namely, in order to improve network use efficiency of the network shown in FIG. 1, in a communication apparatus transmitting data from a LAN to a SONET network, buffer capacity of the mounted LAN interfaces 4, 5 is monitored. When the capacity exceeds a predetermined threshold, and when there is an idle line capacity left on the SONET side, the SONET network bandwidth in VCAT controller 2 is expanded and the concatenation setting of the SONET path transmitting the data from the LAN is changed.

More specifically, by monitoring both POH and LOP (Loss of Pointer), the communication apparatus on the opposite side also changes the concatenation setting of the SONET path, and completes the bandwidth change of the SONET path.

Here, transmission equipment is provided for transmitting input traffic to a remote place rapidly and securely. Missing input traffic is not desired. To prevent such a loss of input traffic, it is necessary to provide a bandwidth on the SONET/SDH network 101 side greater than bandwidths of input ports P1, P2.

However, the data communication traffic through IP, etc. being input to input ports P1, P2 has characteristics of intermittence, as well as abrupt increase or decrease of the data amount. Namely, in some cases there will be no data flow, while in other cases data will flow at a burst to the full bandwidth. Preferably, from the viewpoint of efficient network bandwidth usage, a necessary bandwidth is desirably allocated at necessary times. Also, when there is a room in the bandwidth, the remainder of the necessary bandwidth is to be used for other data transmission.

However, according to the technique disclosed in the aforementioned patent publication, although it is possible to change a path bandwidth on the SONET/SDH network side automatically, there is a problem of temporary interruption during the transmission service. By combining VCAT with LCAS, path bandwidth on the SONET/SDH network side can be changed without interruption. However, according to the conventional system configuration, this bandwidth change can only be performed by a command, issued from an externally provided network supervision and control system (hereafter referred to as network management system: NMS) 102 to a device monitoring and controlling section 6. With such a means, it is not possible to cope with abrupt change in the input traffic.

As a result, duration of no data transmission in a SONET/SDH path lasts for a certain period, which impedes efficient bandwidth use of the network. Or, flow control or data discarding may cause a problem of impeding the throughput in the upper layer.

SUMMARY OF THE INVENTION

Accordingly, it is an object of the present invention to provide transmission equipment enabling an improved efficiency in network bandwidth usage, and an improved upper-layer throughput even when abrupt change occurs in input traffic.

As a first aspect of the present invention to solve the above-mentioned problems, there is disclosed transmission equipment for transmitting traffic being input from a plurality of ports on the Synchronous Optical Network/Synchronous Digital Hierarchy network paths of which bandwidths are arbitrarily set by Virtual Concatenation and Link Capacity Adjustment Scheme. The transmission equipment includes; an input traffic collector which collects and retains an input traffic amount of each input port for one period at preset periods; a bandwidth set processor which calculates a bandwidth for use in each input port from the input traffic amount retained in the input traffic collector, and calculates the corresponding number of virtual concatenation member paths from the difference of the bandwidth in use and a virtual concatenation path bandwidth having been allocated to the input port, and issues an addition command or a deletion command for adding or deleting the virtual concatenation member paths for the calculated number; a virtual concatenation controller which sets a virtual concatenation path bandwidth against the traffic input from the plurality of ports; and a link capacity adjustment scheme controller which sets and changes the virtual concatenation to the virtual concatenation controller, based on the addition command or the deletion command of the virtual concatenation member paths issued by the bandwidth set processor.

Further, as a second aspect of the present invention to solve the above-mentioned problems, in the first aspect, the transmission equipment includes a virtual concatenation information storage which retains correspondence between each destination node of the virtual concatenation member paths and each input port. The bandwidth set processor allocates an idle virtual concatenation member path having not been allocated to any virtual concatenation paths to an input port which has the same destination node and requires increasing the virtual concatenation path bandwidth.

Still further, as a third aspect of the present invention, in the first aspect, the transmission equipment further includes an input port set information storage which retains a bandwidth allocation priority and a minimum guarantee bandwidth. In the bandwidth set processor, when the addition command of a virtual concatenation member path is issued to the link capacity adjustment scheme controller, an input port having a higher priority is processed preferentially, and when the deletion command of a virtual concatenation member path is issued to the link capacity adjustment scheme controller, the issue of the deletion command is restrained so that the virtual concatenation path bandwidth may not fall below the minimum guarantee bandwidth.

Further, as a fourth aspect of the present invention, in the first aspect, the transmission equipment includes a buffer which retains the input traffic correspondingly to each plurality of input ports. The preset period for collecting the input traffic amount in the input traffic amount collector is determined by calculating ratios of each buffer size to each maximum bandwidth for the entire plurality of input ports, and using the shortest value as the preset period.

Further, as a fifth aspect of the present invention, in the first aspect, when the input port bandwidth in use falls below the virtual concatenation path bandwidth, the bandwidth set processor suspends issue of the deletion command of a virtual concatenation member path to the link capacity adjustment scheme controller for a certain time, thereby avoiding a state of failure to establish the virtual concatenation required for transmission, caused by excessive addition or deletion of the virtual concatenation member paths in the link capacity adjustment scheme in case of unstable input traffic amount.

With the above-mentioned configurations, according to the present invention, it becomes possible to change a SONET/SDH network bandwidth necessary and sufficient for transmitting data communication traffic with IP, etc. automatically and timely, with simple algorithm using LCAS, without producing service interruption.

By applying the present invention, it becomes possible to improve network bandwidth use efficiency of the SONET/SDH network.

Further scopes and features of the present invention will become more apparent by the following description of the embodiments with the accompanied drawings.

BRIEF DESCRIPTION OF THE DRAWINGS

FIG. 7 shows a diagram illustrating a list of VCAT member path states in LCAS.

DETAILED DESCRIPTION OF THE PREFERRED EMBODIMENTS

The preferred embodiment of the present invention is described hereinafter referring to the charts and drawings. However, the embodiments are provided for the sake of understanding of the present invention, and the protection scope of the present invention is not limited to the embodiments described below.

Figure 1:
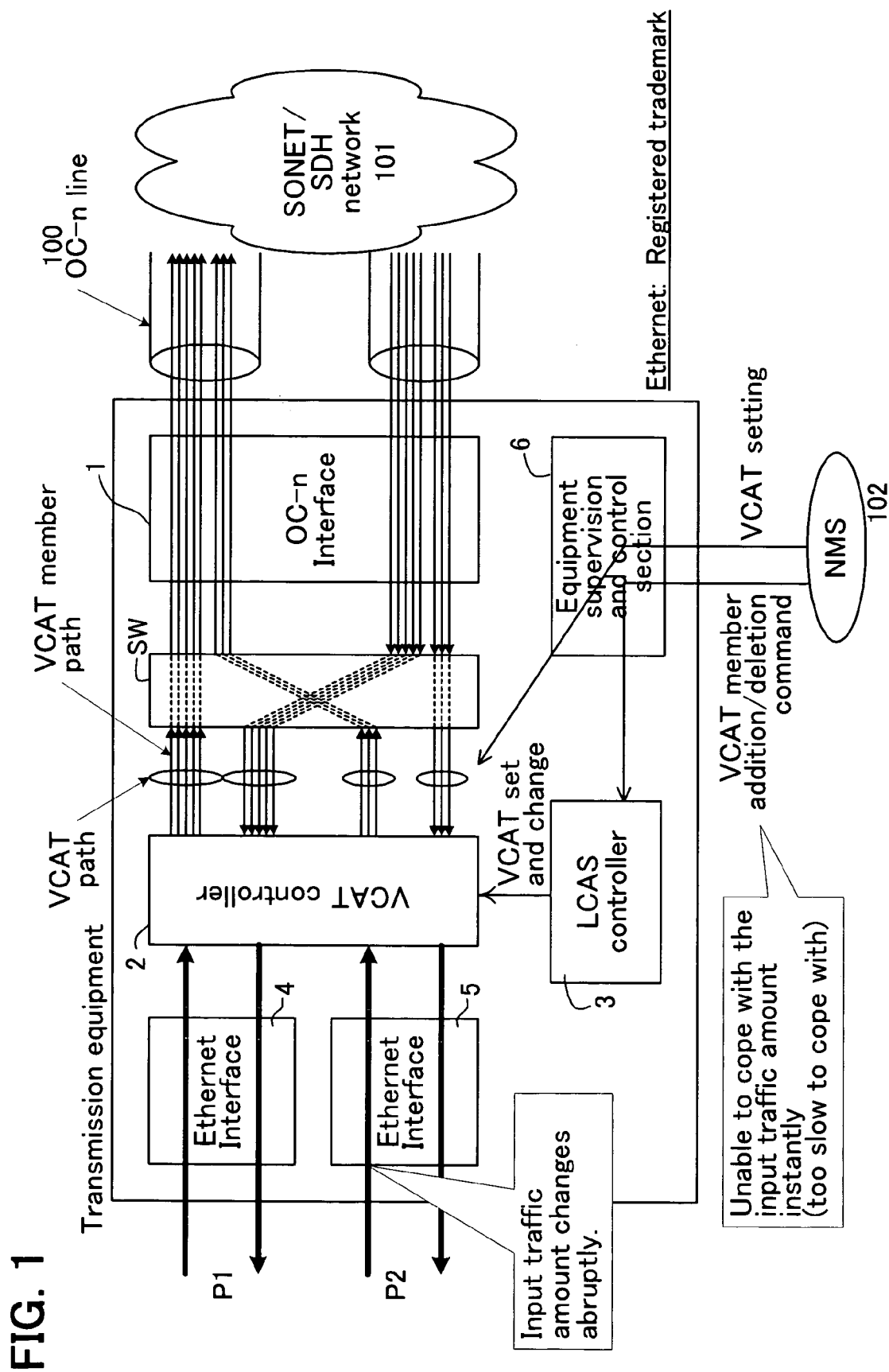
FIG. 1 shows an exemplary configuration of transmission equipment by use of VCAT and LCAS.
Figure 2:
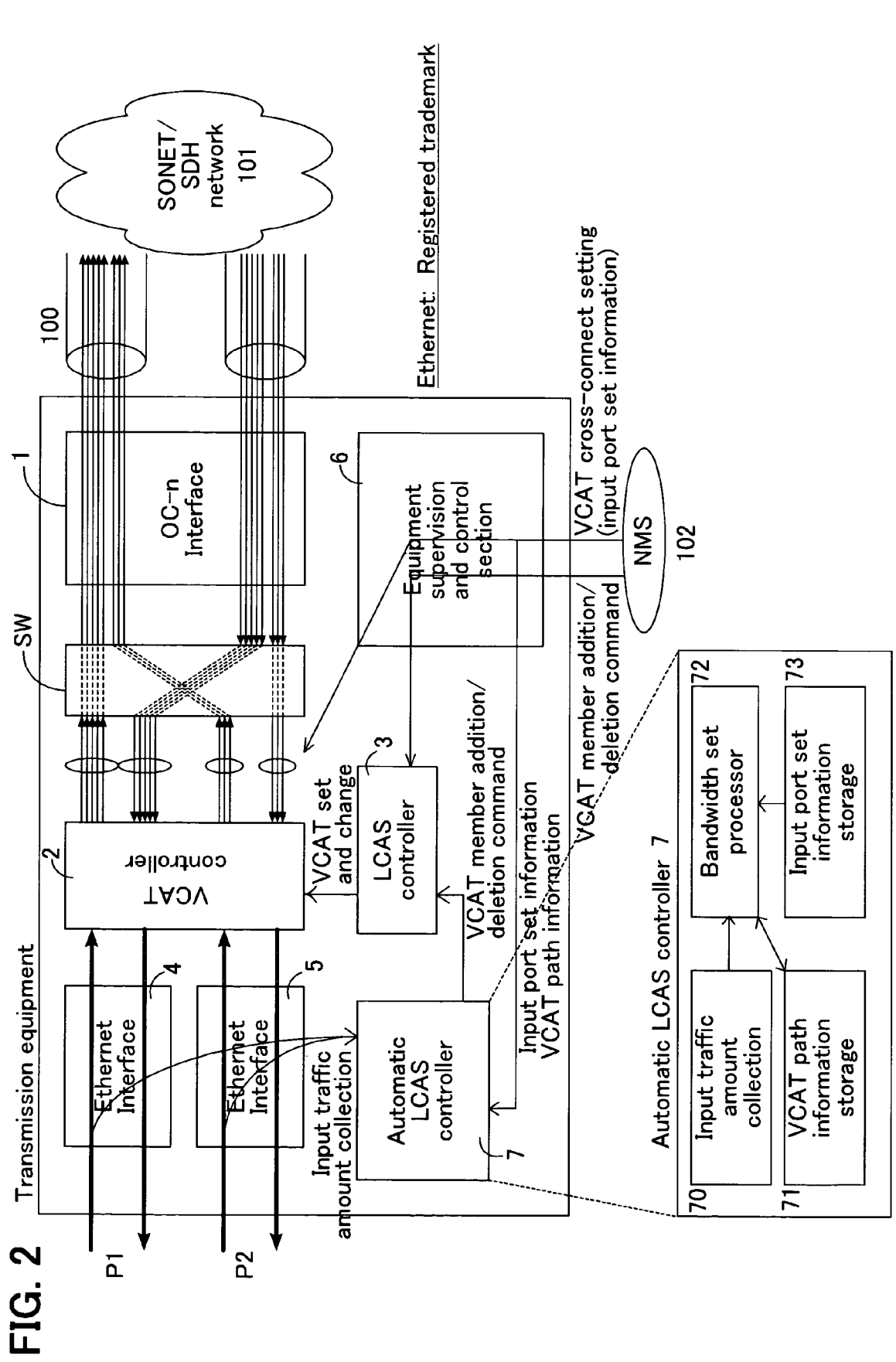
FIG. 2 shows an exemplary configuration of transmission equipment in accordance with the present invention.

FIG. 2 shows an exemplary configuration of transmission equipment in accordance with the present invention. In contrast to the configuration of the transmission equipment according to the conventional technique, automatic LCAS controller 7 is added, forming a feature of the present invention.

Automatic LCAS controller 7 is constituted of input traffic amount collector 70, VCAT path information storage 71, bandwidth set processor 72, and input port set information storage 73, as shown by the enlarged diagram in the lower part of FIG. 2. Functions of these configuration portions can be implemented using hardware or software.

A non-illustrated equipment operator sets collection periods for collecting the traffic amount input to the transmission equipment in input traffic amount collector 70 via supervision and control section 6, by use of network management system (NMS) 102. Or, the operator may instruct input traffic amount collector 70 to calculate the collection period automatically.

When the collection period is automatically calculated in input traffic amount collector 70, the collection period is calculated from both the maximum bandwidths of the registered input ports P1, P2 and a buffer size provided in Ethernet interfaces 4, 5 for temporarily storing the input traffic when the input traffic is carried on the VCAT path.

In input traffic amount collector 70, the amount of buffers mounted thereon is set in advance for each kind of the input ports.

For example, assuming that the maximum bandwidth of the input port P1 is 1 Gbps, and the buffer size of Ethernet interface 4 is 2 Megabytes (Mbytes), the period is:

2 Mbytes/1 Gbps=16 msec.

Such a period is calculated for the entire input ports, and the shortest value is selected as the collection period. With this method, it becomes possible to reduce a data loss probability caused by buffer overflow in interface 5, which may occur before completing the bandwidth setting change.

Here, a processing time of the LCAS protocol is necessary for completing the bandwidth setting change. Therefore, with the above calculation, it is not possible to eliminate the data loss completely. If the processing can be performed, in view of performance, within the period obtained in the following way, it may also be possible to apply: Set an average LCAS processing time in advance into input traffic amount collector 70, and newly determine a period by subtracting this processing time from the above obtained period.

Next, the equipment operator performs line connection settings of both the input ports and the VCAT path, via network management system (NMS) 102. At this time, as set parameters, initial bandwidth (the number of VCAT member paths MP to be allocated first to the input port), destination node, bandwidth allocation priority, and minimum guarantee bandwidth are designated.

The initial VCAT path bandwidth is set in VCAT controller 2, and each destination node is registered in VCAT path information storage 71 for each VCAT member path MP, together with each assigned input port identifier.

Figures 3, 4, 5:
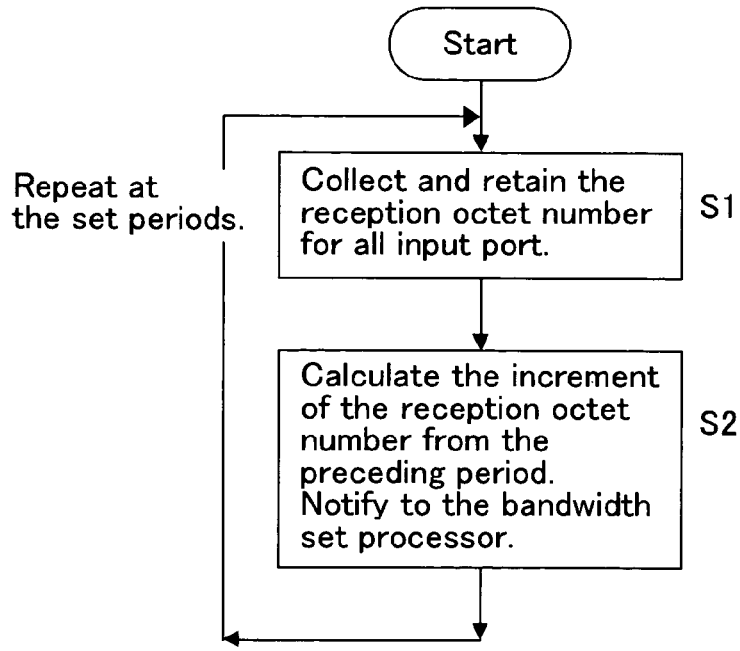
FIG. 3 shows a diagram illustrating exemplary table information stored in a VCAT path information storage.
FIG. 4 shows a diagram illustrating exemplary table information stored in an input port set information storage.
FIG. 5 shows a diagram illustrating a processing flow of an input traffic collector.

For example, the information is registered in VCAT path information storage 71 in a tabular form exemplarily shown in FIG. 3. In the table shown in FIG. 3, the relations among the ID of the VCAT member path MP, the destination node of the path, and the input node ID are shown.

Further, the bandwidth allocation priorities and the minimum guarantee bandwidths of the VCAT path, as well as the identifier ID of the input ports P1, P2, are registered in input port set information storage 73. FIG. 4 shows an information table registered in an input port set information storage 73. In this FIG. 4, the kinds of the bandwidth allocation priorities are provided, for example, for the total number of the input ports which can be registered in the equipment, and each bandwidth allocation priority is defined in such a manner that any priority number is not overlapped to others, at the time of registering the input ports. Further, rules are set in advance such that a greater priority number denotes a higher bandwidth allocation priority, and so on. In the example shown in FIG. 4, it is understood that a greater minimum guarantee bandwidth is assigned to the input port having the bandwidth allocation priority of 10.

Input traffic amount collector 70 collects the input traffic amount from non-illustrated buffers in Ethernet interfaces 4, 5 corresponding to the entire input ports having been registered, at the above-mentioned preset periods. The collection procedure exemplarily corresponds to the processing flow shown in FIG. 5.

In the example shown in FIG. 5, assuming that the input port is an Ethernet interface, input traffic amount collector 70 collects an attribute value named as aOctetsReceivedOK (received number of octets) in the MAC entity standardized in IEEE 802.3 (step S1).

Although this attribute is categorized in the Recommended Package, it is mounted on substantially all MAC chips available in the market, and therefore, can be used as a numerical value representing the input traffic amount. Input traffic amount collector 70 collects this received number of octets for the entire input ports P1, P2. Input traffic amount collector 70 then calculates an increment (or decrement) from the value of one period before (that is, the input traffic amount in the most recent period), and notifies bandwidth set processor 72 of this calculated value (step S2).

Bandwidth set processor 72 first groups the input ports into those having the same destination nodes of the VCAT member paths from the table information shown in FIG. 3, and performs the following processing on a group-by-group basis.

Figure 6:
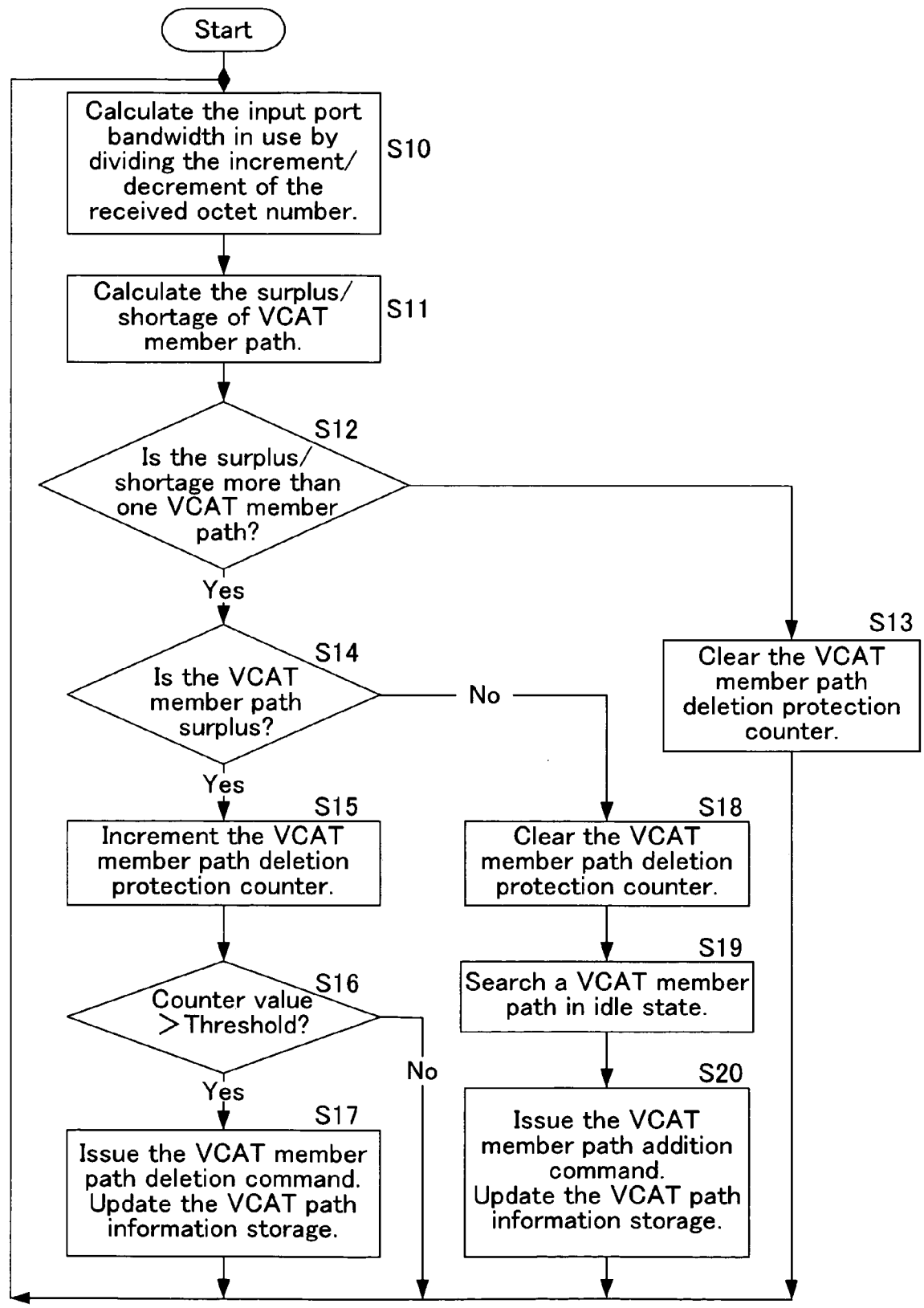
FIG. 6 shows a diagram illustrating a processing flow of a bandwidth set processor.

Namely, the processing shown in the flowchart of FIG. 6 is repeatedly performed for each port, in order of the highest bandwidth allocation priority.

The processing shown in FIG. 6 will be illustrated below in due order.

First, bandwidth set processor 72 calculates an input bandwidth in use, from the input traffic amount stored in input traffic amount collector 70 (step S10). This can be obtained by dividing an increment in the number of octets for one period by the period. For example, assuming the increment in the number of octets is 1.5 Mbytes and one period is 20 msec, (1.5 Mbytes*8)bits/20 msec=600 Mbps Thus, the calculated input bandwidth in use is 600 Mbps.

Next, from VCAT controller 2, bandwidth set processor 72 acquires the VCAT path bandwidth allocated to the input port of interest, and calculates the difference between the input port bandwidth in use and the VCAT path bandwidth (which is calculated from a bandwidth per one VCAT member path MP and the number of VCAT member paths currently allocated). Namely, either surplus or shortage of the VCAT member paths MP is calculated (step S11).

Next, the absolute value of the difference corresponding either the surplus or the shortage is divided by the bandwidth per one VCAT member path, so as to obtain the number of VCAT number paths corresponding to the surplus or the shortage. If the result is less than one path ('No' in step S12), a VCAT member path deletion protection counter (not shown) is cleared, and the process proceeds to the processing for the next port (step S13).

On the other hand, if the above result corresponds to one path or more ('Yes' in step S12), the process proceeds to the following.

If the VCAT member path is indicative of surplus, namely the input port bandwidth in use<the VCAT path bandwidth ('Yes' in step S14), the above-mentioned VCAT member path deletion protection counter is incremented (step S15).

Further, if this protection counter value exceeds a predetermined threshold ('Yes' in step S16), bandwidth set processor 72 selects any VCAT member path(s) in the state of 'NORM command being transmitted' (which is a state of the path currently allocated as VCAT path in view of LCAS management. Refer to FIG. 7.), for the number of paths calculated above, from the VCAT path currently allocated to the input port (step S17).

At this time, the number of selection is limited so that the resultant VCAT path bandwidth does not fall below the minimum guarantee bandwidth (refer to FIG. 4) of the port concerned, which has been stored in input port set information storage 73. A delete command for deleting the selected VCAT member paths is then issued to LCAS controller 3. Further, 'noallocation' is set into the input port field corresponding to the deleted VCAT member paths, in VCAT path information storage 71 (step S17).

Meanwhile, in step S14, in case of the input port bandwidth in use>the VCAT path bandwidth ('No' in step S14), the VCAT member path deletion protection counter is cleared (step S18).

Next, referring to the information stored in LCAS controller 3, bandwidth set processor 72 searches for a VCAT member path(s) in the state of 'IDLE command being transmitted' (which is a state of the path not allocated to any VCAT paths in view of LCAS management. Refer to FIG. 7.) When finding any VCAT member path(s) in the state of the IDLE command being transmitted, bandwidth set processor 72 selects the paths for the number calculated earlier. Bandwidth set processor 72 then issues a command to LCAS controller 3, so as to add the selected VCAT member paths into the VCAT path currently allocated to the input port concerned, and sets a port identifier of the port concerned into the input port field corresponding to the added VCAT member path ID, in the table of VCAT path information storage 71 shown in FIG. 3.

INDUSTRIAL APPLICABILITY

Through the processing described above, it becomes possible to perform automatic calculation and change of the VCAT path bandwidths, corresponding to the input traffic amount to each input port. Thus, improved use efficiency of the SONET/SDH network bandwidth can be obtained, bringing about remarkable advantage in the industry.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. Transmission equipment transmitting traffic signals input from a plurality of ports on the Synchronous Optical Network/Synchronous Digital Hierarchy network paths of which bandwidths are arbitrarily set by a Virtual Concatenation and Link Capacity Adjustment Scheme, said transmission equipment comprising:
    an input traffic collector which collects and retains a traffic amount of traffic signals input in each input port for one period at preset periods;
    a bandwidth set processor which
        calculates a bandwidth for use in each input port from the traffic amount of traffic signals, retained in the input traffic collector,
        calculates a corresponding number of virtual concatenation member paths from a difference between the calculated bandwidth in use and a virtual concatenation path bandwidth having been allocated to the input port, and
        issues an addition command for adding or a deletion command for deleting the virtual concatenation member paths for the calculated number;
    a virtual concatenation controller which sets a virtual concatenation path bandwidth on the traffic input from the plurality of ports; and
    a link capacity adjustment scheme controller which controls the virtual concatenation to set and change the virtual concatenation path bandwidth, based on the addition command or the deletion command of the virtual concatenation member paths issued by the bandwidth set processor.

2. The transmission equipment according to claim 1 further comprising:
    a virtual concatenation information storage which retains correspondence between each destination node of the virtual concatenation member paths and each input port,
    wherein the bandwidth set processor allocates an idle virtual concatenation member path having not been allocated to any virtual concatenation paths to an input port which has the same destination node and requires increasing the virtual concatenation path bandwidth.

3. The transmission equipment according to claim 1 further comprising:
    an input port set information storage which retains a bandwidth allocation priority and a minimum guarantee bandwidth,
    wherein, in the bandwidth set processor, when the addition command of a virtual concatenation member path is issued to the link capacity adjustment scheme controller, an input port having a higher priority is processed preferentially, and when the deletion command of a virtual concatenation member path is issued to the link capacity adjustment scheme controller, the issue of the deletion command is restrained so that the virtual concatenation path bandwidth may not fall below the minimum guarantee bandwidth.

4. The transmission equipment according to claim 1, further comprising:
    buffers each of which retains the input traffic correspondingly to each of the plurality of input ports,
    wherein, the preset period for collecting the input traffic amount in the input traffic amount collector is determined by calculating ratios of each buffer size to each maximum bandwidth for the entire plurality of input ports, and using the shortest value as the preset period.

5. The transmission equipment according to claim 1,
    wherein, when the input port bandwidth in use falls below the virtual concatenation path bandwidth, the bandwidth set processor suspends issue of the deletion command of a virtual concatenation member path to the link capacity adjustment scheme controller for a certain time, thereby avoiding a state of failure to establish the virtual concatenation required for transmission, caused by excessive addition or deletion of the virtual concatenation member paths in the link capacity adjustment scheme in case of unstable input traffic amount.

6. An input traffic collector for transmission equipment transmitting traffic signals input from a plurality of ports on the Synchronous Optical Network/Synchronous Digital Hierarchy network paths of which bandwidths are arbitrarily set by a Virtual Concatenation and Link Capacity Adjustment Scheme, said input traffic collector comprising:
    a collector which collects and retains a traffic amount of traffic signals input in each input port for one period at preset periods; and
    buffers each of which retains the input traffic correspondingly to each of the plurality of input ports,
    wherein, the preset period for collecting the input traffic amount in the collector is determined by calculating ratios of each buffer size to each maximum bandwidth for the entire plurality of input ports, and using the shortest value as the preset period.

* * * * *